United States Patent [19]

Teiling

[11] 4,265,111
[45] May 5, 1981

[54] DEVICE FOR DETERMINING VERTICAL DIRECTION

[75] Inventor: Torbern Teiling, Lidingö, Sweden

[73] Assignee: Aktiebolaget Bofors, Bofors, Sweden

[21] Appl. No.: 9,568

[22] Filed: Feb. 5, 1979

[30] Foreign Application Priority Data

Feb. 22, 1978 [SE] Sweden ................................. 7802038

[51] Int. Cl.³ ............................................. G01C 21/00
[52] U.S. Cl. ................................... 73/178 R; 33/236; 89/41 CE
[58] Field of Search ............. 89/41 CE; 73/178 R, 73/504; 33/236, 237, 238, 239, 275 G, 318; 364/453; 74/5.34

[56] References Cited

U.S. PATENT DOCUMENTS

| | | | |
|---|---|---|---|
| 2,715,274 | 8/1955 | James | 33/236 |
| 2,948,193 | 8/1960 | Leathers et al. | 89/41 CE |
| 2,989,672 | 6/1961 | Agins | 89/41 CE |
| 3,015,254 | 1/1962 | Leathers et al. | 89/41 CE |
| 3,599,495 | 8/1971 | Brown et al. | 73/504 |

*Primary Examiner*—Donald O. Woodiel
*Attorney, Agent, or Firm*—Pollock, Vande Sande & Priddy

[57] ABSTRACT

An improved system for determining the vertical direction relative to a moving base includes gyroscopic rate sensors for determining angular velocities of a device such as a weapon mounted on the base, relative to two orthogonal axes; a gyroscopic rate sensor for determining the roll angle velocity of the system and a calculating circuit for determining the roll and pitch angles needed to ascertain the vertical direction.

8 Claims, 5 Drawing Figures

DEVICE FOR DETERMINING VERTICAL DIRECTION

BACKGROUND OF THE INVENTION

The present invention relates to a device for determining the vertical direction of a system which is supported on a moving base, for instance a craft, a vehicle, an aircraft, a ship, or the like.

The invention can be applied advantageously to a weapon system which is to be stabilized on a vehicle, and therefore, in the following, will be described with reference to such an application. However, it is obvious that the invention is not limited to such a weapon system, but can be applied generally when the vertical direction in relation to a moving base is to be determined.

When determining the vertical direction in relation to a moving base it is a common practice to use a so-called vertical gyro, which comprises a gimbal mounted gyro, the spin axis of which is directed vertically. When this vertical direction once has been established, and the gimbal mount of the gyro is free from friction, the vertical direction of the spin axis is retained, regardless of the position of the base. As a rule, the position of the base in relation to the vertical direction is determined by measuring two angles, the so-called roll and pitch angles. Conventional vertical gyros vary as regards the method of compensating for the unavoidable gyro drift, static and dynamic accuracy and the like. A common feature of vertical gyros is that they comprise gyros mounted in gimbals, the mechanical design of which is rather complicated. It has therefore, in other applications, been attempted to use velocity-sensing gyroscopic sensors instead, for instance rate gyros, which in relation to conventional, two-axis gyros have the important advantage that the manufacturing cost will be considerably lower. This is due to the fact that gyroscopic sensors have a simple mechanical design, with only one sensitive axis.

When a weapon which can be elevated and traversed is to be stabilized, that is, when the aiming of the barrel of the weapon is to be made independent of movements of the base, information is required in regard to the rotating movements around two axes. It is previously known to measure the rotating movements with gyroscopic sensors which measure the turning velocities of the weapon in elevation and traverse.

When the weapon is included in a weapon system which also comprises fire control equipment with at least one aiming telescope and one calculator, however, information is also required in regard to the turning angle of the elevation axis around the direction of the barrel from the vertical plane, and also often the angle of the direction of the barrel towards the horizontal plane. The conventional designation of these angles is the roll and pitch angle, and in the following this designation will thus be used. The most common method hitherto used of measuring these angles has been with the aid of the conventional vertical gyros.

SUMMARY OF THE INVENTION

The purpose of the present invention is now to achieve a device for determining the vertical direction without needing to utilize conventional gyros of the above-mentioned kind. Instead, only single-axis gyroscopic sensors are used for measuring the velocity of the movements of the base, and initial determining of the vertical direction and compensating of the gyro drift can be carried out by simple angle-measuring verticl pendulums. Furthermore, the advantage is also gained that, as a rule, the gyroscope sensors can usually be included as signal transmitters to other functions in the system in which information in regard to the vertical direction is desired. The device is then mainly characterized by a first and a second gyroscopic sensor for measuring the angular velocity of the weapon in relation to two right-angled axis directions, a third gyroscopic sensor for measuring the roll angle velocity of the base, and means for calculating the roll and pitch angle of the base in dependence on said measured angular velocities.

BRIEF DESCRIPTION OF THE DRAWINGS

In the following, the invention will be described in more detail with reference to the attached drawings, in which.

DETAILED DESCRIPTION OF THE PREFERRED EMBODIMENTS

In order that a weapon may be aimed at a target, it is usually supported in such a way that it can be moved angularly in relation to its transport base. The weapon is then arranged to be turned around two axes with the aid of servomotors. The barrel of the weapon can for instance be mounted so that it can be elevated in a tank turret, while the tank turret, in turn, can be traversed in relation to a chassis.

Figure 1:
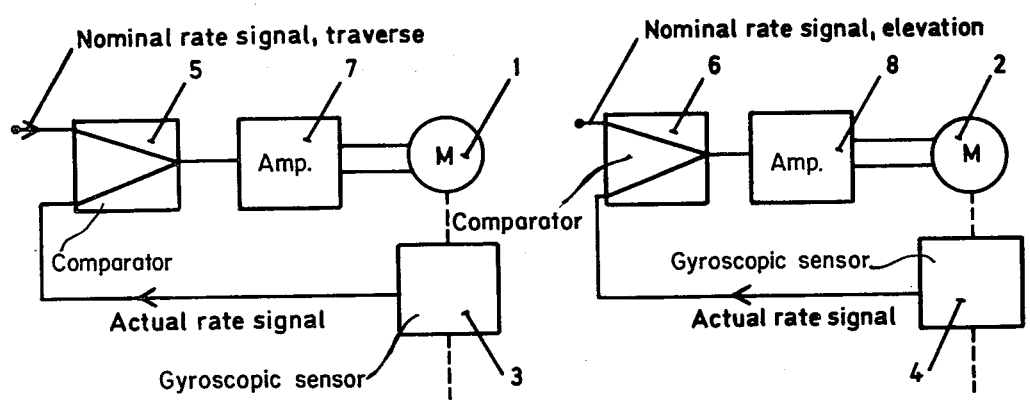
FIG. 1 shows schematically the principle of how a weapon can be stabilized.

In FIG. 1 it is shown schematically how such a conventional system for controlling a weapon vertically and horizontally can be built up. The turning of the weapon horizontally is carried out by a servomotor 1 which engages in a gear ring or the like on the tank turret, while the elevation of the weapon takes place with the aid of a servomotor 2, placed in the tank turret, and which engages in a gear arc or the like of the elevating mass. Further, gyroscopic sensors 3 and 4, for instance rate gyros, are arranged to measure the rotating movements of the weapon. The sensor 3 then emits an electric output signal which is proportional to the turning velocity in traverse in relation to the ground, i.e. the rotating speed of the tank turret around the traversal axis, while the sensor 4 emits an output signal proportional to the turning velocity in elevation, i.e. the rotating speed of the barrel around the elevation axis, this too in relation to the ground.

The signals emitted from the two gyroscopic sensors 3 and 4 constitute the actual angular velocities of the system, and control the servomotors 1 and 2 so that the rotating speed of the weapon will be very close to zero; that is, the weapon is stabilized. The two actual velocities are then fed to a comparator 5 and 6, respectively, and are there compared with nominal velocities in traverse and elevation, respectively, received from an outer control system. The differences emitted from the comparators 5 and 6 are thereafter fed to the servomotors 1 and 2 via amplifiers 7 and 8, respectively, which in addition to the signal amplification as a rule also contain appropriate dynamic filters, integrators and the like. If the nominal velocities from the outer system are zero, the turning movements of the weapon in relation to the ground will be close to zero, depending on the quality of the motor system.

A conventional system usually also has a fire control system, which includes at least one aiming telescope and calculator. The design of the fire control system and the aiming telescope has no significance in principle for the invention, and therefore will not be described in detail. The aiming telescope can, for instance, be of the kind where a gun layer continuously judges the position of the optical line of sight for the telescope in relation to a target observed with the telescope. The gun layer can thereafter with the aid of a control lever or the like influence the two servomotors 1 and 2 by feeding nominal signals of an appropriate magnitude to the two aiming systems, so that the weapon can be elevated and traversed. In this way, the gun layer can track the target with the aid of the aiming telescope, and appropriate angles of aim-off and tangent elevation can be calculated by the fire control calculator, notwithstanding the fact that the base, for instance a vehicle on which the weapon system is mounted, at the same time is subjected to rotating movements arising, for example, due to driving.

In addition to the above-mentioned rotating movements of the weapon, which are measured with the gyroscopic sensors 3 and 4, information is required for the first control calculator about the vertical direction, that is, the roll angle and also the pitch angle of the weapon. According to the invention, these angles are measured with a device of which the design, in principle, is shown in FIG. 2, and the designates shown in the figure then represent angular velocities and angles, which are defined as:

$\Omega\eta$: the rotating velocity of the weapon around the elevation axis in relation to space, i.e. the rotating velocity in elevation, $\Omega\phi$: the rotating velocity of the weapon around the traversing axis, i.e. the rotating velocity in traverse, $\Omega\xi$: the rotating velocity of the weapon around the axis of the bore, i.e. the roll angle velocity, ml: the rotation position of the elevation axis around the axis of the bore in relation to the horizontal plane, i.e. the roll angle, and n: the vertical angle of the axis of the bore to the horizontal plane, i.e. the pitch angle.

The device comprises a gyroscopic sensor 9 applied on the weapon and which measures the roll angle velocity of the weapon, that is, the turning velocity of the weapon around the axis of the bore, and emits an output signal which is proportional to this velocity $\Omega\xi$. The output signal is fed to a calculating unit 10, which will be described in more detail with reference to FIG. 4. To the calculating unit 10 are also fed signals corresponding to the turning velocities in elevation and traverse, $\Omega\eta$ and $\Omega\phi$, respectively, from the sensors 3 and 4 in the stabilizing system, the gyro sensor 4 then being arranged at right angles to the barrel of the weapon. From the calculating unit 10 are thereafter emitted output signals corresponding to $\dot{m}l$ and $\dot{n}$, which constitute a measure of the roll angle velocity and the pitch angle velocity, respectively. These signals are thereafter fed to integrators 11 and 12 which integrate the signals received ($\dot{m}l$ and $\dot{n}$) signals corresponding to ml and n then arising on the output of the integrators. These signals are fed back to the calculating unit 10.

Figure 2:
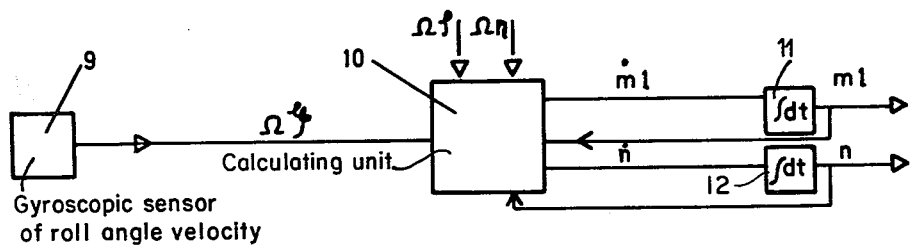
FIG. 2 shows the principle of how the vertical direction can be determined with a device according to the invention.

Through the device according to FIG. 2, a relation between the measured angular velocities (the $\Omega$-signals) and the roll and pitch angle (the ml and the n signals, respectively) is obtained. In order that this relation shall be correct, however, it is necessary that integration constants for the two integrations are added. According to the invention, this can be done through successive supervision from two outer devices, which at least under static conditions can measure the angles ml and n in question. An example of such devices of a simple kind is a pendulum provided with an angle transmitter.

Figure 3:
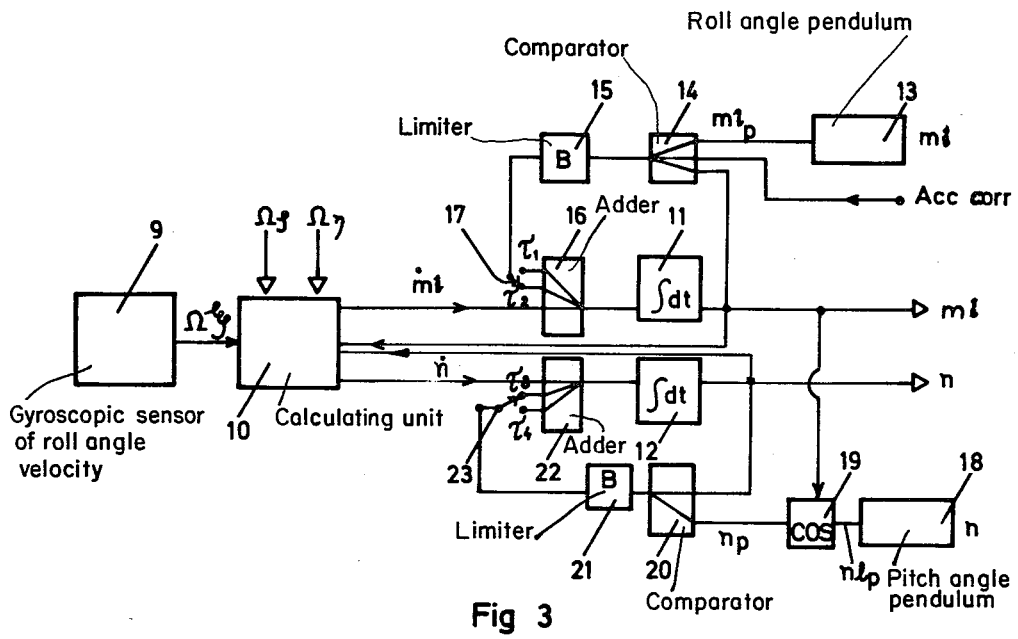
FIG. 3 shows the device complemented with means for initial determining of the vertical direction.

FIG. 3 shows with the aid of a block diagram an appropriate embodiment of the invention, which also comprises means for determining the integration constants. In the figure, the same reference designations have been used as in FIG. 2 for the parts which correspond to each other. A pendulum 13 measures the angle ml, i.e. the roll angle, and emits an output signal $ml_p$ as a measure of this angle. The signal $ml_p$ is fed to one of the inputs of a comparator 14. The other input of the comparator is connected to the output of the integrator 11. In the comparator 14 a comparison then takes place between the signals ml and $ml_p$ and the difference is fed to a circuit 15, which is arranged to limit the difference to a predetermined value, after which the signal is fed to the input of the integrator 11 via a circuit 16, in which the signal is summed up with the signal $\dot{m}l$ from the calculating unit 10. Through a change-over switch 17 on the input of the circuit 16 the magnitude of the actuation can be regulated. In the figure this has been indicated symbolically with the values $\tau_1$ and $\tau_2$, which at the same time indicate the time constant with which the output value ml of the integrator swings in towards $ml_p$.

When the weapon system is not stationary, i.e. when the vehicle on which the weapon is mounted is in motion, the pendulum is also subjected to accelerations other than the force of gravity, and therefore, it is only on the average that the angular information is correct during any long period of time. As the supervision through the limiting circuit 15 is limited, so that a maximal, selectable change velocity of the integrator is obtained, it is achieved that undesired drift of the integrator 11 is compensated, while large and constant pendulum errors will only slowly change the output value of the integrator. The possibility is also foreseen of introducing an acceleration correction, when applicable consisting of accelerations which an outer system calculates that the pendulum will be subjected to. In the figure, this has been designated with a third input, Acc corr, to the comparator 14. Through the introduction of two $\tau$ values of different size, $\tau_1$ and $\tau_2$, the lesser value $\tau_1$ can be used for more rapid swinging in of the output value of the integrator before the gyroscopic sensors start or have been started. It is also appropriate to have the lesser $\tau$-value, $\tau_1$, connected when the vehicle is stationary.

In the same way as described above, means are required for determining the integration constant of the integrator 12. The device therefore comprises a pendulum 18, for measuring the pitch angle which is present. As the turning axis also of this pendulum is fixed in relation to the weapon and parallel to the elevation axis, however, the pendulum does not measure the angle n but instead the angle nl, that is, the angle in a plane at right angles to the elevation axis between the axis of the bore and the horizontal plane. In the application example indicated, said angle, as in the case of the angle n, is little when the vehicle is in motion, and therefore the measured angle $nl_p$ can be transferred with sufficient accuracy to np by multiplication by cos ml. The output signal from the pendulum 18 is therefore fed to a circuit 19, the output signal of which consists of the signal nlp · cos ml. This signal is thereafter, analogous with what is stated above, fed to the input of a comparator 20 for comparison with the n signal on the output of the integrator 12. The difference is fed to a circuit 21, which is arranged to limit the difference to a predetermined value, after which the signal is fed to the input of the integrator 12 via a circuit 22, in which the signal is summed up with the n signal from the calculating unit 10. Through a change-over switch 23 on the input of the circuit 22 the amount of actuation can be regulated. The time constants $\tau_3$ and $\tau_4$ which are used need then not necessarily be the same as those used for the ml integrator.

Figure 4:
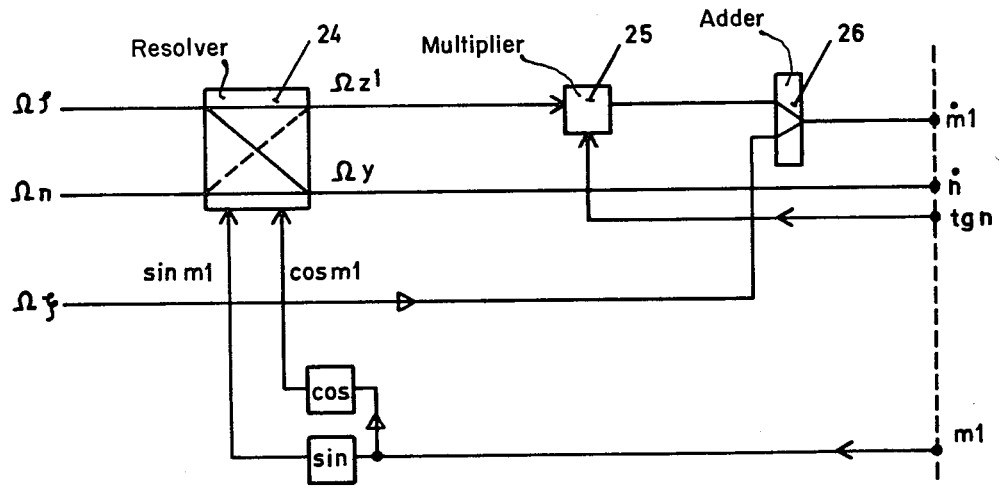
FIG. 4 shows how the calculation means are built up.

With reference to FIG. 4, it will now be described in more detail how the calculating unit 10 can be designed. The $\Omega\phi$ and $\Omega\eta$ signals on the input of the calculating unit represent the turning velocity of the weapon in traverse and elevation, respectively, and are at right angles to each other. These signals are transmitted or translated by means of a resolver 24 to components in a new, second co-ordinate system, which is turned to the angle ml in relation to the first co-ordinate system. This has been indicated in the figure by the signals sin ml and cos ml being formed and fed to the resolver 24. The components in the second co-ordinate system are designated $\Omega_z'$ and $\Omega y$. The latter component then directly represents the value n. The former component is multiplied with the aid of a multiplier circuit 25 by tg n, and in the present example of the application, tg n $\approx$ n. The output signal of the multiplier is thereafter added to the input signal $\Omega\xi$, the roll velocity, in a circuit 26, and the output signal ml is then formed.

To summarize, the following equation system is realized through the calculating unit 10

$$\dot{m}l = \Omega\xi - (\Omega\phi' \cdot \cos ml - \Omega\eta \sin ml) \cdot \text{tg } n$$

$$\dot{n} = \Omega\phi \cdot \sin ml + \Omega\eta \cdot \cos ml$$

Only one example of the equation system which can be realized with the aid of the calculating unit 10 is indicated above. Depending on whether the integrators 11 and 12 are to integrate ml and n, respectively, or m and nl, or combinations between these, four variants of the equation system can be used. The angle m then indicates the inclination of the trunnion axis in a vertical plane. Further, the pendulums 13 and 18 can be replaced by accelerometers, which measure angles in the vertical plane and not oblique angles. Also this choice influences the choice of the definite form of the equations. In the example given above of equation systems, however, only the form which is best adapted to the pendulum functions is accounted for.

Figure 5:
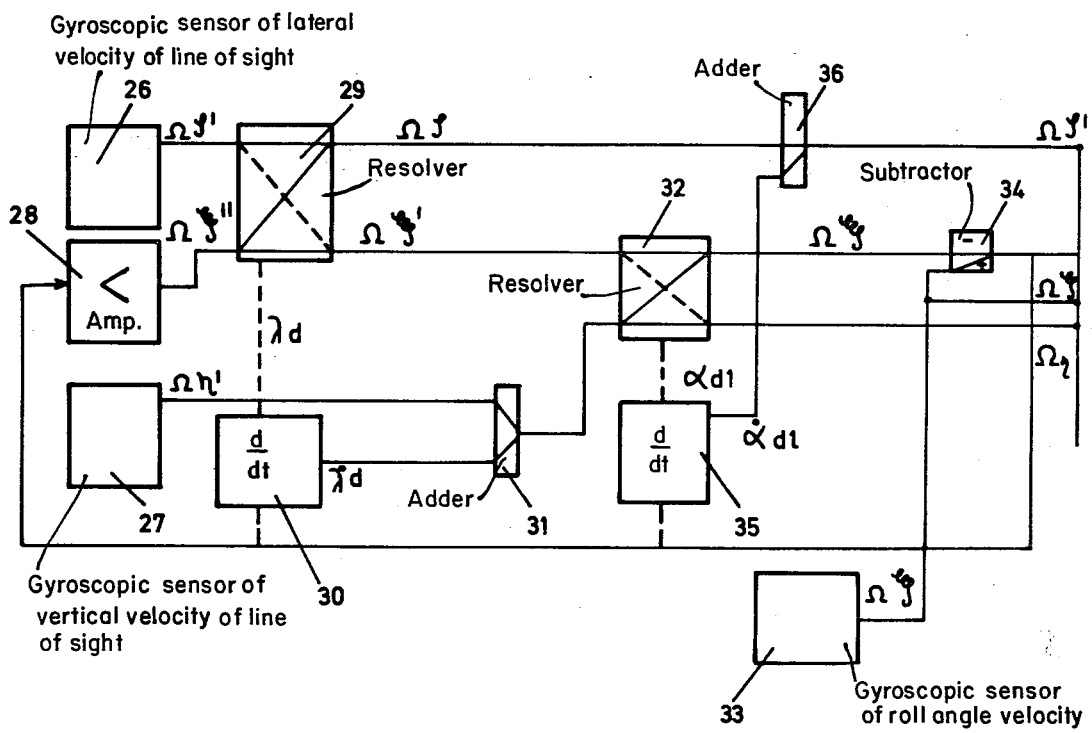
FIG. 5 shows an alternative embodiment of the invention in which two gyroscopic sensors have connection to the sight instead of the barrel of the weapon.

With reference to FIG. 5, an embodiment of a device according to the invention is described. Also in this case, the device is described with reference to a stabilized weapon system similar to the one previously described. In this case, however, the line of sight of the aiming telescope included in the system is stabilized primarily in such a way that the two angular velocity sensing gyro sensors are mechanically closely connected with the optical means of determining the aiming, as a rule a mirror or a prism, in the sight. The weapon is then controlled by the stabilized sight in a conventional way. Also in this case, information is desired in regard to the vertical direction, that is, the roll and pitch angle of the weapon, ml and n, respectively, and therefore, according to the invention, the third gyro sensor is also now installed to measure the roll angle velocity $\Omega\xi$ of the weapon. The gyro sensors on the sight can, of course, be positioned somewhat differently, but it is typical that they measure the angular velocity of the line of sight. Further, it is characteristic for the system that the line of sight of the aiming telescope and the barrel of the weapon as a rule are not parallel but are separated by two angles, the so-called angles of aim-off, one in traverse and one in elevation, in the figure designated $\alpha_{dl}$ and $\lambda_d$.

According to FIG. 5, the invention comprises a gyroscopic sensor 26 for measuring the angular velocity $\Omega\phi'$ of the line of sight laterally and a gyroscopic sensor 27 for measuring the angular velocity $\Omega\eta'$ of the line of sight vertically. An assumed rotating velocity $\Omega\xi''$ in the direction of the line of sight is applied from the output of an amplifier 28. The signals emitted from the gyroscopic sensor 26 and the amplifier 28 are fed to a resolver 29, in which the signals are transmitted to a new co-ordinate system, which is turned to the angle $\lambda_d$ in relation to the co-ordinate system of the barrel. In a first derivation circuit 30 the derivative of $\lambda_d$ is formed, which derivative is summed up with the velocity signal $\Omega\eta'$ emitted from the gyroscopic sensor 27 in a circuit 31. The signal thus formed is fed to one of the inputs of a further resolver 32. The other input of the resolver receives the $\Omega\xi'$ signal from the former resolver 29. In the resolver 32 the signals are transferred to still another co-ordinate system, which is turned to the angle $\alpha_{dl}$ in relation to the co-ordinate system of the barrel. The $\Omega\xi$ signal occurring on the output of the resolver 32 must now conform to the roll angle velocity $\Omega\xi$ which has been measured with the gyroscopic sensor 33, which is arranged on the weapon and measures the angular velocity in the roll direction. In a circuit 34 the difference between these two signals is formed, after which the difference signal is fed back to the input of the amplifier 28. By designing the amplifier 28 so that it carries out at least one integration and has an amplification which exceeds a certain value, the input signal to the amplifier through the closed circuit will be small, and the difference between the calculated and the measured value of the roll angle velocity $\Omega\xi$ will be negligible. Further, the device comprises a second derivation circuit 35 which forms the derivative of the resolver angle $\alpha_{dl}$. The derivative $\dot{\alpha}_{dl}$ thus formed is summed up in a circuit 36 with the $\Omega\phi$ signal emitted by the resolver 29, after which the output signal is fed to the calculating unit 10, analogously with the embodiment according to FIG. 3. The rotating velocity signals thus formed, $\Omega\phi$, $\Omega\eta$ and $\Omega\xi$ are identical to the corresponding signals in FIG. 3, i.e. the signals which would have been obtained if the gyroscopic sensors placed on the sight had instead been placed on the weapon. The signals can hereby be fed to the calculating unit 10, and the following device for calculating the desired angles ml and n, i.e. the roll and pitch angle of the weapon, is identical to the device according to FIG. 3.

I claim:

1. Apparatus for determining the vertical direction relative to a weapon system mounted on a moving base such as a craft, vehicle, aircraft, ship or the like, said apparatus comprising:
   first gyroscopic means for measuring the angular velocity of said weapon system with respect to a first axis;
   second gyroscopic means for measuring the angular velocity of said weapon system with respect to a second axis perpendicular to said first axis;
   third gyroscopic means for measuring the roll angle velocity of said moving base;
   means for determining an initial value of the vertical direction; and
   means for calculating from said initial value, said two angular velocities and said roll angle velocity the roll angle and pitch angle of said moving base, thereby determining the coordinates of said vertical direction.

2. Apparatus according to claim 1, wherein said calculating means comprises means responsive to said two angular velocities and said roll angle velocity for determining the time derivative of said roll angle and said pitch angle, and means for integrating said derivatives to produce outputs proportional to said roll angle and said pitch angle.

3. Apparatus according to claim 2, wherein said means for determining the time derivative comprises resolver means for translating the angular velocities measured by said first and second means to a second coordinate system turned at an angle corresponding to said roll angle of said moving base, in relation to the first coordinate system in which said first and second means measure said angular velocities.

4. Apparatus according to claim 3, wherein said resolver means produces a first signal in response to the angular velocity measured by said first gyroscopic means, said first signal corresponding to the angular velocity of said weapon system in traverse in said first coordinate system, further comprising means for multiplying said first signal by tg·n, in which n is the pitch angle, to produce a second signal; and means for adding a third signal proportional to the roll angle velocity as measured by said third gyroscopic means to said second signal.

5. Apparatus according to claim 2, wherein said means for determining an initial value of said vertical direction comprises first and second pendulums for producing first and second signals proportional to said roll and pitch angles; further comprising means for comparing said first and second signals produced by said pendulums to the respective outputs of said integrating means, and means for allowing any difference signals emitted by said comparing means to influence the inputs to said integrating means.

6. Apparatus according to claim 5, further comprising means for multiplying said second signal from said second pendulum, proportional to pitch angle, by the cosine of the roll angle, prior to applying said second signal to said comparing means.

7. Apparatus according to claim 1, wherein said means for determining an initial value of said vertical direction comprises first and second pendulums for measuring said roll and pitch angles.

8. Apparatus for determining the vertical direction relative to a weapon system mounted on a moving base such as a craft, vehicle, aircraft, ship or the like, said apparatus comprising:
   first gyroscopic means for measuring the angular velocity of said weapon system with respect to a first axis;
   second gyroscopic means for measuring the angular velocity of said weapon system with respect to a second axis perpendicular to said first axis;
   third gyroscopic means for measuring the roll angle velocity of said moving base; and
   means for calculating from said two angular velocities and said roll angle velocity the roll angle and pitch angle of said moving base, said calculating means comprising means responsive to said two angular velocities and said roll angle velocity for determining the time derivative of said roll angle and said pitch angle, said means for determining the time derivative, comprising resolver means for translating the angular velocities measured by said first and second means to a second coordinate system turned at an angle corresponding to said roll angle of said moving base in relation to the first coordinate system in which said first and second means measure said angular velocities, said resolver means producing, in response to the angular velocity measured by said first means, a first signal corresponding to the angular velocity of said weapon system in traverse in said first coordinate system, and means for integrating said time derivatives to produce outputs proportional to said roll angle and said pitch angle;
   means for multiplying said first signal by tg·n, in which n is the pitch angle, to produce a second signal; and
   means for adding to said second signal a third signal proportional to the roll angle velocity as measured by said third means.

* * * * *